3,631,134
PROCESS FOR THE CONTINUOUS PRODUCTION OF FOAMS FROM CURABLE SYNTHETIC RESINS
Hans Scheuermann and Wilhelm Krieger, Ludwigshafen, Rhine, and Leo Unterstenhoefer, Limburgerhof, Pfalz, Germany, assignors to Badische Anilin- & Soda-Fabrik Aktiengesellschaft, Ludwigshafen am Rhine, Germany
Filed Feb. 23, 1967, Ser. No. 618,039
Claims priority, application Germany, Feb. 26, 1966, P 16 29 276.5
Int. Cl. C08f 47/10; C08v 1/16
U.S. Cl. 260—2.5 F    2 Claims

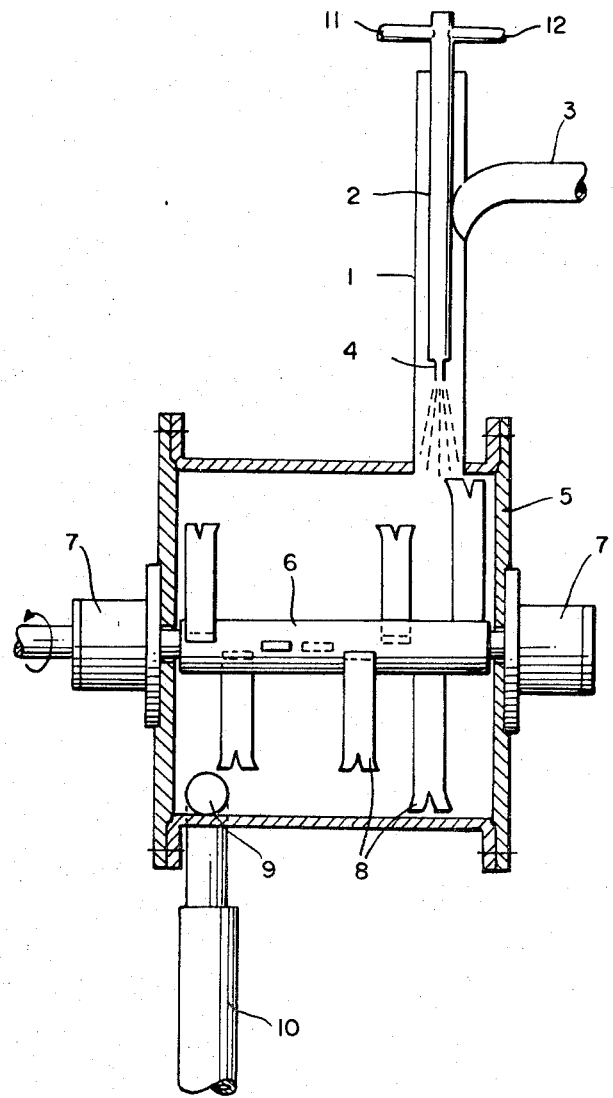

ABSTRACT OF THE DISCLOSURE

A continuous process for the production of foams from curable synthetic resins in which aqueous solutions are foamed by means of foaming agents, the resultant foams are mixed with aqueous solutions of resins in a pre-mixing zone and then in a main mixing zone and the mixtures are discharged from the mixing zone and cured, as well as an apparatus for carrying out the process.

This invention relates to a continuous process for the production of foams from curable synthetic resins and an apparatus for carrying out the process.

It is known that foams of curable synthetic resins can be produced by mixing a solution of a resin, e.g. a urea-formaldehyde condensation product, with a foamed solution of a foaming agent and curing the resultant foamed mixture. One method which has established itself in industry consists in foaming a solution of the foaming agent, which solution may contain a curing agent, and mixing the foam obtained with a solution of the synthetic resin. Various types of apparatus for the production of foamed resins by the said process are known. One apparatus which is frequently used consists for example of a stirred vessel closed on one side and into which a solution containing foaming agent and curing agent is introduced which is foamed by vigorous stirring. A solution of the synthetic resin is then introduced into the foam through a valve situated near the outlet of the vessel. A modified version of such an apparatus has two separate stirred vessels; in the first vessel foaming is carried out and in the second vessel the solution of the synthetic resin is added. The said processes and apparatuses are mainly used for the production of foams from urea-formaldehyde condensation products. The processes carried out by means of the said apparatuses have a serious disadvantage. It has been found that resin deposits are formed on the walls of the vessels, at the openings through which the resin is introduced and in the pipes through which the finished foam is discharged. This is mainly due to the uneven distribution of the resin in the foamed solution. As a result of these deposits the effective cross-sectional areas of the inlets and outlets as well as of the vessel themselves is decreased so that the metering of resin and foam becomes inaccurate. Moreover, lumps of hard resin or foam which become detached from time to time are dispersed throughout the foam so that an inhomogeneous end product is obtained. It is therefore necessary to clean such equipment at frequent intervals.

According to a more recent method the aqueous solution of a foaming agent and the solution of a urea resin are introduced into a vessel in which a shaft with several discs is rotatably mounted in a bearing on one side. The resin solution is jetted onto the rotating discs and owing to the centrifugal force is carried to the walls of the vessel where the foamed aqueous solution is introduced. In this way foam and resin are mixed, and the foamed resin can be withdrawn on the side of the vessel opposite to the driving shaft for the discs. This apparatus is equipped with scraping means for removing resin deposits. Such a mixing process involves high expenditure for equipment so that it has not established itself in industry.

It is an object of this invention to provide a particularly advantageous continuous process for the production of foams from curable synthetic resins. Another object of the invention is to provide an apparatus for carrying out the process.

These objects are achieved by a process for the production of foams from curable synthetic resins by foaming an aqueous solution of a foaming agent containing a curing agent, mixing the resultant foam with an aqueous solution of a curable synthetic resin in a pre-mixing zone and a main mixing zone, discharging the foamed resin from the main mixing zone and curing the foamed resin, wherein the foam is passed through a cylindrical tube and the resin solution is introduced under pressure concentrically into the tube in the direction in which the foam moves, the greatest cross-sectional area of the jet of resin being smaller than the cross-sectional area of the tube and the distance between the point of introduction of the resin and the point of entry of the mixture into the main mixing zone not exceeding twice the diameter of the tube, the resin thus premixed with the foam is passed into the main mixing zone, the two components are constantly agitated throughout the main mixing zone, and the foamed resin is discharged from the main mixing zone.

The process is suitable for the production of foams from curable synthetic resins. Examples of such resins are aminoplast resins and phenolic resins, which are advantageously processed in aqueous solution. The process is used with particular advantage for foaming aqueous solutions of urea-formaldehyde condensation products. Intermediate condensation products are used therein which can be cured by means of curing agents to form cross-linked products. Acids or compounds producing acids under the action of formaldehyde are suitable as curing agents for the urea resins.

The resins are mixed with a foam obtained by foaming an aqueous solution of a foaming agent. Substances conventionally used as foaming agents may be employed, e.g. fatty alcohol sulfates having 8 to 18 carbon atoms in the chain, ethenoxylated sulfates of alcohols, alkyl benzoyl-sulfates, and alkylphenols. The solutions may contain curing agents which are conventionally used for the synthetic resins. The solution of foaming agent is advantageously foamed by means of compressed air. However, gases other than air may also be used for this purpose. Foaming is carried out with particular advantage by supplying the solution axially to a cylindrical vessel to which a long tube is attached, introducing a gas under pressure tangentially into the cylindrical vessel and withdrawing the resultant foam from the tube.

For premixing the foam with the resin the foam is passed through a cylindrical tube and the resin solution is introduced under pressure concentrically into the tube in the direction in which the foam moves. The greatest cross-sectional area of the jet of resin should be smaller than the cross-sectional area of the tube; it should advantageously be 75 to 80% of the cross-sectional area of the tube. Consequently the resin which is introduced into the tube does not touch its walls at any point. In this way the deposition of resin on the walls is prevented. In a preferred embodiment of the process according to this invention the resin and the compressed air are tangentially introduced into a tube and mixed therein, which tube has an outlet whose diameter is smaller than that of the tube itself. The process is carried out with particular advantage by introducing the mixture of resin and air into the stream of foam at the same or approximately the same velocity at which the foam moves through the tube. The term "approximately the same velocity" is intended to mean a velocity which differs from that of the foam by ±10 to 25%.

The foam which has been premixed with curable syntheitc resin is passed into the main mixing zone, where the mixture is stirred in such a way that it is kept in motion at any point of the mixing zone so that the formation of deposits is prevented.

The mixture of foam and curable synthetic resin is discharged from the main mixing zone before curing. Curing does not take place until the mixture has left the main mixing zone. Care should be taken to ensure, by choosing suitable curing agents, that the curing period is longer than the residence time of the mixture in the mixing zones.

An apparatus which is suitable for carrying out the process is shown in the accompanying drawing by way of example. Tube 1 serves to premix the aqueous foam with the aqueous solution of the curable synthetic resin. In tube 1 there is arranged concentrically a line 2 for introducing the resin solution, if desired by means of compressed air. The ratio of the cross-sectional area of line 2 to the cross-sectional area of the premixing tube 1 is advantageously 1:2 to 1:4. Upstream of the outlet of line 2 a tube 3 leads into tube 1; through tube 3 the foamed solution of the foaming agent is introduced into tube 1. The distance between the outlet of line 2 and the outlet of tube 3 is advantageously 10 to 15 times the diameter of line 2. The end of line 2 is advantageously provided with a constriction consisitng of a thin-walled tube 4 whose internal diameter is smaller than that of line 2. At the top of line 2 there are arranged two tangential branch connections 11 and 12 for introducing resin and compressed air respectively. The mixing tube 1 is arranged radially at one end of a cylindrical mixing vessel 5. The distance between the end of the line 2 and the wall of the mixing vessel 5 should advantageously be once to twice the diameter of the tube 1. A stirrer shaft 6 is arranged concentrically in the cylindrical mixing vessel 5. This shaft is mounted in bearings 7 at either end. It is provided with stirrer blades 8 whose length is advantageously half the diameter of the mixing vessel 5. The stirrer blades 8 are arranged in pairs. The blades of each pair are offset in relation to one another by the width of one blade and form an angle of 180° C. Any two adjacent pairs of stirrer blades form an angle of 45° C., resulting in a screw-like arrangement of the blades. The stirrer blades 8 are arranged in such a way that they sweep the whole inner space of the mixing vessel except for small clearances at the periphery and at both ends. Stirrer blades with a rectangular cross seciton have proved to be particularly advantageous. The end of each stirrer blade is advantageously broader than the rest of the blade; the end may for example be swallow-tailed. At the end of the mixing vessel 5 opposite the one where the mixing tube 1 enters the vessel there is an outlet 9 which is advantageously arranged tangentially The mixture of foam and resin is discharged through this outlet and passed through a hose 10 which is connected to the outlet.

Horizontally arranged mixing vessels 5 in which the ratio of length to diameter is from 1:1 to 1:2 are particularly advantageous. The volume of the mixing vessel is from about 1/1000 to 1/1500 of the amount of foam produced per hour. The peripheral speed of the stirrer blades 8 should be 12 to 30 meters per second. The hose 10 is preferably made of an elastomeric plastic. When the hose is subjected to an internal pressure which is 0.1 to 0.5 atmosphere gauge higher than the pressure in the plant, the hose should advantageously expand by 15 to 20% of its diameter.

When using the above apparatus, each of the stirrer blades sweeps a cylindrical section of the mixing zone. In these sections the foam is made to rotate, a zone of pressure being built up in front of the blade and a zone of negative gauge pressure behind the blades. Owing to the centrifugal force, those portions of resin which have not been mixed with the foam and those portions of foam which contain too much resin are conveyed to the periphery of the mixing vessel, where they are distributed and brought into the zone of negative pressure of the next section so that they are mixed with the foam. At least 6 to 8 sections with their zones of pressure and negative pressure are required. It is usually not necessary to have more than 12 of such sections.

The foams of curable synthetic resins obtained by using the process and apparatus according to the invention are particularly uniform. The amount of aqueous solution of foaming agent and the amount of resin solution may be varied within certain limits; the ratio is governed by the desired density of the foamed resin.

It has been found that when introducing the solution of the synthetic resin into the stream of foam in the mixing tube no resin deposits are formed on the tube walls. When the velocity of the stream of resin is the same or approximately the same as that of the stream of foam, as is the case with the process according to this invention, the formation of resin deposits at the outlet of line 2 is prevented. The formation of resin deposits is also prevented during mixing in the mixing vessel and during withdrawal of the foamed resin through the elastic hose which serves to convey the foamed resin to the point where it is required. One advantage of the process according to this invention is that there are no disturbances resulting from resin deposits in the mixing tube and mixing vessel. A paritcular advantage is that very uniform foams are obtained; any differences in quality are due to irregularities in the metering of the starting materials. The apparatus according to the invention guarantees trouble-free operation over a long period of time, it being unnecessary to interrupt operation for the purpose of cleaning. The process and apparatus according to the invention are therefore particularly suitable for the production of large amounts of foamed resin such as are required in agriculture in particular.

The invention will be further illustrated by the following examples.

EXAMPLE 1

(a) In a foaming apparatus which is fundamentally the same as that shown in the accompanying drawing, 7.2 liters of an aqueous solution of foaming agent is introduced per minute into a tube 1 having a diameter of 40 mm. The solution of foaming agent contains 1% by weight of sodium diisobutylnapthalene-sulfonate as foaming agent and 1.5% by weight of phosphoric acid as curing agent. 13.0 l. per minute of a solution of a urea-formaldehyde condensation product is introduced into the aqueous foam through a line 2 diameter is 20 m. The solution contains 34% by weight of urea-formaldehyde condensation product (the molar ratio of urea to formaldehyde being 1:1.3). The end of line 2 is situated at a distance of 65 mm. from the inlet of the cylindrical mixing vessel 5. The mixing vessel 5 is 300 mm. in diameter and 30 mm. in length. The stirrer shaft 6 is provided with 4 pairs of stirrer blades, each pair forming an angle of 45° with the next pair. The outlet 9 has a diameter of 50 mm. The foamed resin is withdrawn through a hose 10 which consists of plasticized polyvinyl chloride. The apparatus produces about 24 m.$^3$ of foamed resin per hour. The compresive strength of the foam is between 500 and 520 g./cm.$^2$. The term "compressive strength" is defined as that weight which depresses the foam by 10 mm. on an area of 1 cm$^2$. Cube-shaped specimens with sides 50 mm. in length are used for the measurements. The apparatus can be operated for a period of 12 hours.

Phenol-formaldehyde condensation products can be foamed in the same way.

(b) The same amounts of aqueous foam and urea-formaldehyde condensation product as given under (a)

are mixed in a cylindrical stirred vessel 400 mm. in diameter and 900 mm. in height. The stirrer shaft is provided with 3 stirrer blades, the distance between adjacent blades being 50 mm. The resin is mixed with the foam prior to introduction into the stirred vessel. The apparatus produces 6 m.$^3$ of foamed resin per hour.

After only 2 hours' operation deposits have formed to such an extent that the vessel has to be cleaned. The compressive strength of the foamed resin is 380 to 420 g./cm.$^2$.

(c) An aqueous foam, as described under (a), is supplied to one end of a cylindrical mixing vessel 40 mm. in diameter and 400 mm. in length. The resin solution is introduced into the mixing vessel in such a way that resin and foam are mixed owing to turbulence over the whole cross section. The foamed resin is withdrawn at the other end of the vessel through a thick-walled hose.

The apparatus produces 6 m.$^3$ of foamed resin per hour. The compressive strength of the foam ranges 290 to 380 g./cm.$^2$.

After 1½ hours' operation deposits of resin have formed to such an extent that the vessel has to be cleaned.

EXAMPLE 2

A foam is produced from a urea-formaldehyde condensation product using the method and aparatus described in Example 1(a). The speed of the stirrer blades is varied. As may be seen from the table below, foams with different properties are obtained. The most favorable range of speeds is 1000 to 1800 r.p.m. This corresponds to peripheral speeds of 15.8 to 28.5 m./sec.

The foams obtained are comminuted to a mean particle size of 5 mm. The dumped volume of the particles obtained from 1 liter of foam is measured. The larger the dumped volume of the particles, the better the quality of the foam.

TABLE
[Effect of stirrer speed on compressive strength of foam and dumped volume of foam particles. Residence time of foam in the mixing vessel: 3 seconds]

| Speed (r.p.m.) | Unit weight of foam (kg./m.³) | Compressive strength of foam (g./cm.²) | Appearance of foam | Dumped volume of 5-mm. particles obtained from 1 liter of foam (l) | Formation of deposits in mixing vessel. |
| --- | --- | --- | --- | --- | --- |
| 425 | 15 | 357 | Coarse-pored | 1.8 | Slight deposits on shaft and blades. |
| 600 | 15 | 385 | do | 2.0 | Do. |
| 860 | 15 | 494 | Somewhat coarse-pored | 2.2 | Slight deposits. |
| 1,000 | 15 | 500 | Small blisters | 2.45 | Free from deposits. |
| 1,200 | 15 | 540 | Fine-pored | 2.65 | Do. |
| 1,500 | 15 | 550 | do | 2.7 | Do. |
| 1,800 | 15 | 502 | Blisters | 2.6 | Do. |
| 2,000 | 15 | 500 | do | 2.37 | Do. |

NOTE.—The optimum range of speeds is from 1,000 to 1,800 r.p.m., corresponding to peripheral speeds of from 15.8 to 28.5 m./sec.

We claim:

1. A continuous process for the production of foams from curable urea-formaldehyde resins by foaming an aqueous solution of a foaming agent and a curing agent, mixing the resultant aqueous foam concurrently with an aqueous solution of a curable urea-formaldehyde resin in a tube serving as a premixing zone and a cylindrical vessel with a concentrically arranged stirrer as a main mixing zone, discharging the foamed resin from the main mixing zone and curing the foamed resin, wherein premixing is effected by passing the aqueous foam through a cylindrical tube and the resin solution is introduced under pressure at a velocity which is from 0.75 to 1.25 times the velocity of the aqueous foam concentrically into the tube concurrently with the aqueous foam, the distance between the point of introduction of the resin and the point of entry of the resinous foam into the main mixing zone being from one to two times the diameter of the tube and mixing is effected by passing the premixed resinous foam into the main mixing zone at a space velocity such that the amount of foam produced per hour is from 1,000 to 1,500 times the volume of the main mixing zone, the inner space of said main mixing zone being swept thoroughly by a stirrer rotating with a peripheral speed of from 12 to 30 meters per second and discharged the foamed resin from the main mixing zone.

2. A continuous process for the production of foams from curable urea-formaldehyde resins by foaming an aqueous solution of a foaming agent and a curing agent, mixing the resultant aqueous foam concurrently with an aqueous solution of a curable urea-formaldehyde resin in a tube serving as a premixing zone and a cylindrical vessel with a concentrically arranged stirrer as a main mixing zone, discharging the foamed resin from the main mixing zone and curing the foamed resin, wherein premixing is effected by passing the aqueous foam through a cylindrical tube and the resin solution is introduced under pressure at a velocity which is equal to the velocity of the aqueous foam concentrically into the tube concurrently with the aqueous foam, the distance between the point of introduction of the resin and the point of entry of the resinous foam into the main mixing zone being from one to two times the diameter of the tube and mixing is effected by passing the premixed resinous foam into the main mixing zone at a space velocity such that the amount of foam produced per hour is from 1,000 to 1,5000 times the volume the the main mixing zone, the inner space of said main mixing zone through an elastic hose expanding by rotating with a peripheral speed of from 12 to 30 meters per second and discharging the foamed resin from the main mixing zone through an elastic hose expanding by 15 to 25% of its diameter under an internal pressure of 0.1 to 0.5 atmosphere gauge.

References Cited

UNITED STATES PATENTS

| | | | |
| --- | --- | --- | --- |
| 2,813,780 | 11/1957 | Vieli (1) | 260—2.5 F |
| 3,150,108 | 9/1964 | Vieli (2) | 260—2.5 F |
| 3,186,959 | 1/1965 | Shriver et al. (1) | 260—2.5 F |
| 3,231,525 | 1/1966 | Kelly et al. | 260—2.5 F |
| 3,256,067 | 6/1966 | Shriver et al. (2) | 260—2.5 F |
| 3,306,861 | 2/1967 | Justice | 260—2.5 F |
| 3,377,139 | 4/1968 | MacGregor et al. | 260—2.5 F |

MURRAY TILLMAN, Primary Examiner

M. FOELAK, Assistant Examiner

U.S. Cl. X.R.

23—285 V

UNITED STATES PATENT OFFICE
CERTIFICATE OF CORRECTION

Patent No. 3,631,134      Dated December 28, 1971

Inventor(s) Hans Scheuermann et al

It is certified that error appears in the above-identified patent and that said Letters Patent are hereby corrected as shown below:

Column 3, line 52, "seciton" should read -- section --; line 70, "20%" should read -- 25% --.

Column 4, line 54, "line 2 diameter" should read -- line 2 whose diameter --; line 60, "30 mm." should read -- 300 mm. --.

Column 6, line 30, claim 2, "1,5000" should read -- 1,500 --; lines 32 to 33, "zone through an elastic hose expanding by rotating" should read -- zone being swept thoroughly by a stirrer rotating --.

Signed and sealed this 13th day of June 1972.

(SEAL)
Attest:

EDWARD M. FLETCHER, JR.
Attesting Officer

ROBERT GOTTSCHALK
Commissioner of Patents